Nov. 14, 1961  J. A. SCHNEIDER  3,008,739
JOURNAL BOX SEAL
Filed Feb. 8, 1957  2 Sheets-Sheet 1
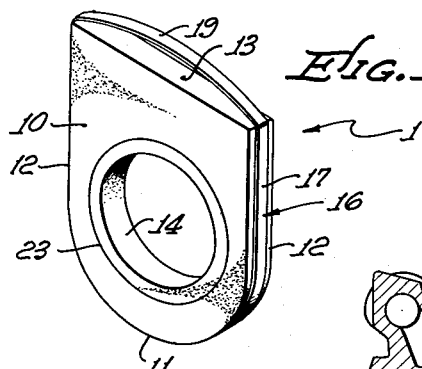
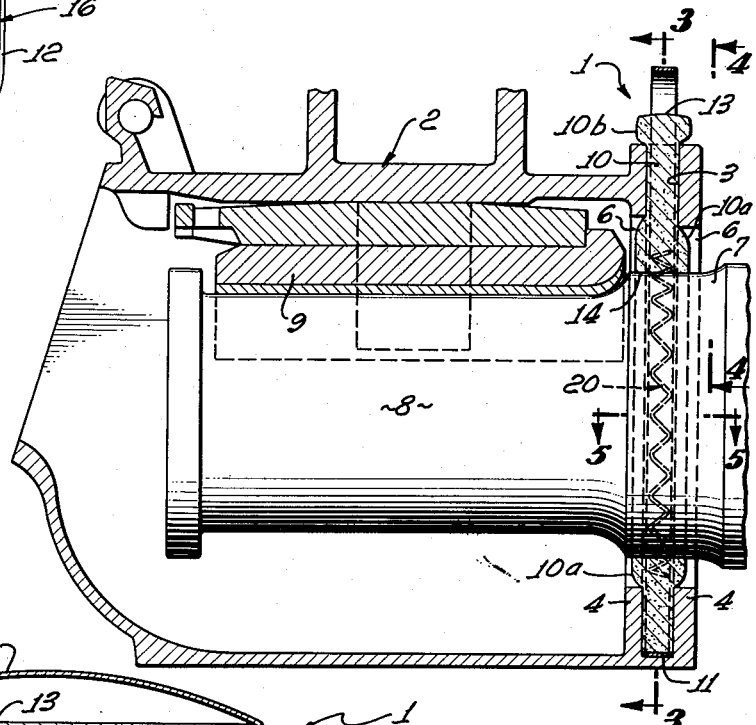
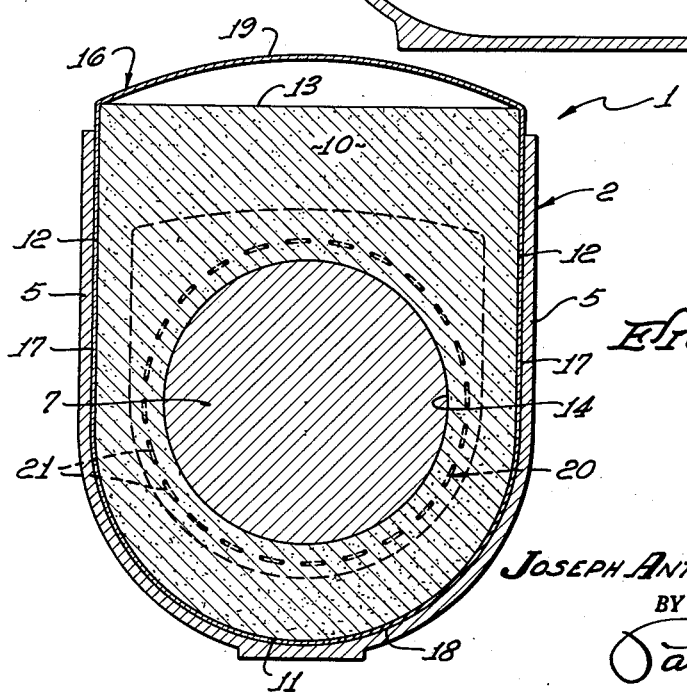
INVENTOR.
JOSEPH ANTHONY SCHNEIDER
BY
Paul A. Weilein
ATTORNEY.

Nov. 14, 1961 J. A. SCHNEIDER 3,008,739
JOURNAL BOX SEAL
Filed Feb. 8, 1957 2 Sheets-Sheet 2
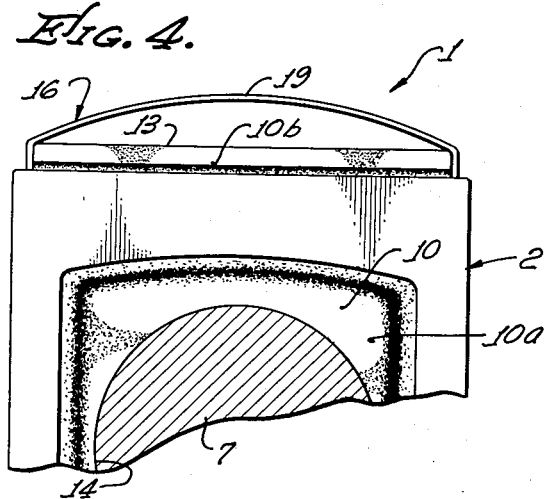
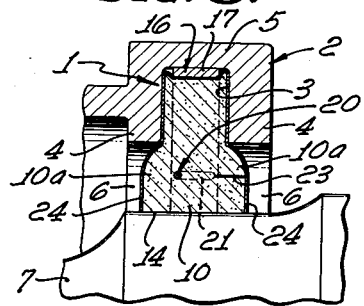
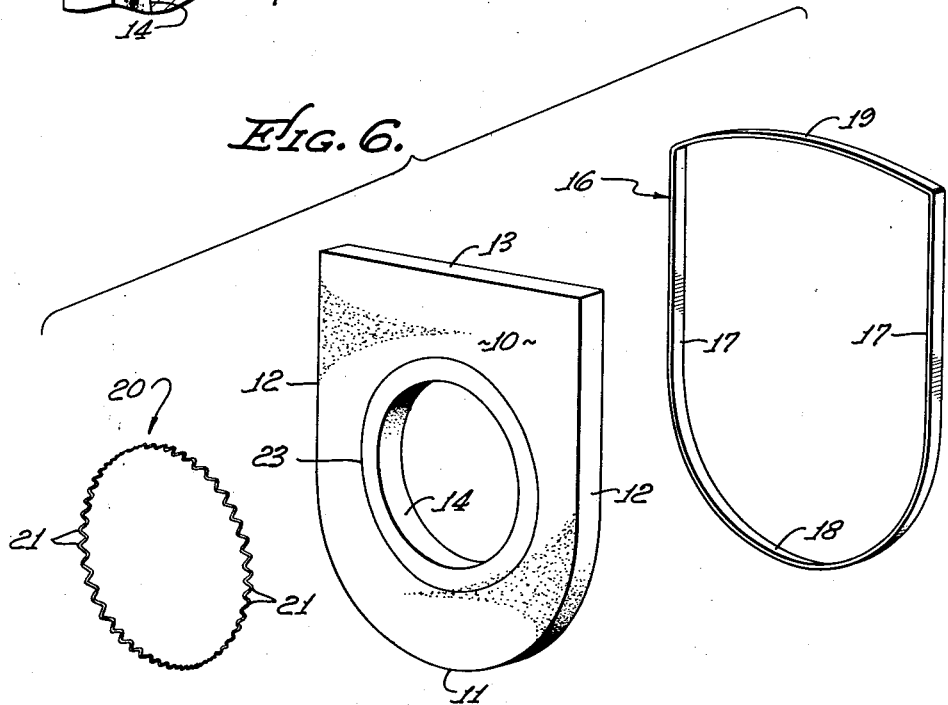
INVENTOR.
JOSEPH ANTHONY SCHNEIDER
BY
Paul A. Weilein
ATTORNEY.

United States Patent Office
3,008,739
Patented Nov. 14, 1961

3,008,739
JOURNAL BOX SEAL
Joseph Anthony Schneider, Los Angeles, Calif., assignor to Railroad Research Corporation, Reseda, Calif., a corporation of California
Filed Feb. 8, 1957, Ser. No. 639,157
1 Claim. (Cl. 286—6)

This invention relates to seals for the journal boxes of railroad cars.

Heretofore, in the art of supporting or journalling railway car wheel axles in the journal boxes, the box has been provided with a journal bearing through which the axle extends. Waste material, that is a mass of threads, usually of cotton, is stuffed into a portion of the box and soaked with a lubricant for the journal. Such boxes include a slot extending transversely therein for receiving conventional seals having an axle-accommodating opening. These seals are composed of a number of different materials such as wood, fiber board, rubber or the like.

One problem encountered in this type of arrangement is that it has been found that as a result of jarring of the axle, the waste may be deranged, and bits of waste may become lodged between the running faces of the journal and journal bearing. This produces a so-called hot box.

Many types of seals as aforementioned are so constructed that they afford no sealing means for effectively precluding the entry of foreign matter, water or dust into the box through the open top of the slot. Accordingly, separate means for sealing the top of the slot have been resorted to. Such separate sealing means has included strip like dust guards of different kinds employed in conjunction with means such as a retainer clip or mastic for retaining the dust guard in place.

In recent years, the use of waste in the journal box has given way to the use of an oil pan in the box, whereby the journal is continuously bathed or splashed with oil from the pan. Appropriate sealing means, such as aforementioned, for waste-packed boxes, have been found in many instances to be inadequate when an oil pan is employed, since lateral motion of the axle will create a vibratory action in the seals which will tend to pump or diplace fluid axially along the shaft, resulting in loss of lubricant from the journal box.

It is highly desirable therefore that a unitary seal structure be available which will act as an oil seal on the axle and which includes means for sealing the open top of the seal slot against the entry of foreign material such as dust, water and the like. Because of the structure of railway car wheel journal boxes, the provision of such a seal presents a number of problems. The conventional seal slot of a journal box is relatively narrow, so that conventional seals which will fit such a slot have heretofore been correspondingly thin, thus affording sealing engagement over a very limited axial extent of the axle. In addition, such conventional seals which are constructed to fit the slot do not afford adequate sealing contact with the opposed slot walls as is necessary to prevent the passage of oil or other lubricant past the seal through the slot.

It is an object of this invention, in the light of the foregoing problems, to provide a novel journal box seal in the form of a simply constructed unitary device which readily and easily may be mounted in the dust guard slot of a journal box to form and maintain reliable and fluid-tight sealing contact with the slot walls excluding the entrance of foreign matter into the box and preventing leakage of oil from the box.

It is another object of this invention to provide a seal of the character described which includes a pad-like body of compressible, resilient material having a greater width than the dust guard slot and a formation and area of sealing surfaces such as will provide reliable fluid-tight seals around the axle over an axially extended area greater than the width of the slot and with the walls of the slot by virtue of the body being substantially compressed so as to fit within the slot.

Another object of this invention is to provide a journal box seal such as described in which the pad-like body advantageously may be made of a chemical compound known as urethane foam, as this material is flexible, compressible, resilient and has high tear strength and considerable resistance to wear, as well as the quality of forming and maintaining fluid-tight seals and being flame resistant. While this foam material has been found to be particularly well suited to the invention, rubber, synthetic rubber, mixtures of elastic resins and plasticisers or other suitable material may be employed.

It is a further object of this invention to provide a journal box seal such as described in which the compressible pad-like sealing body is reinforced and maintained in the desired pad-like form with large sealing surfaces thereof free from creases and wrinkles, by the use of a reinforcing stabilizing frame generally encompassing and bonded or otherwise fixed to marginal edges of the body, the frame also providing a handle facilitating insertion and removal of the body into and from the journal box.

It is an additional object of this invention to provide a journal box seal such as described in which a novel form of resilient reinforcing element is embedded in the flexible compressible body to cause the body to form and maintain around the axle a reliable fluid-tight seal over an axially extended area as aforesaid.

Yet another object, is the provision of a seal such as described in which the flexible compressible and resilient body may be formed of a uniform thickness throughout, and of an area such that the body will be self-sealing throughout the walls of the slot opposed thereto and effectively frictionally held in the slot without the aid of extraneous fastening means.

Other objects and advantages will be hereinafter described or will become apparent to those skilled in the art to which the invention appertains, and the novel features thereof will be defined in the appended claims.

Referring to the drawings:

FIG. 1 is a perspective view of a journal box seal embodying the present invention;

FIG. 2 is a longitudinal sectional view of a journal box showing the seal mounted in the dust guard slot of the box;

FIG. 3 is a cross sectional view taken on the line 3—3 of FIG. 2;

FIG. 4 is a fragmentary sectional view taken on the line 4—4 of FIG. 2;

FIG. 5 is a fragmentary sectional view taken on the line 5—5 of FIG. 2; and

FIG. 6 is an exploded view showing elements for forming the seal.

As shown in the accompanying drawing, the present invention embodies a sealing device 1 for a conventional railroad car journal box 2. This box includes a dust guard slot 3 formed between a pair of opposed side walls 4 and a pair of end walls 5. The walls 4 are provided with aligned openings 6 to accommodate the axle 7 so that the journal 8 on the axle can be disposed in the box proper within a journal bearing 9. The openings 6 are of considerably greater diameter than the diameter of the axle so that the axle is free to move laterally.

The sealing device 1 includes a pad or body 10 of compressible and resilient material, such as rubber, synthetic rubber and mixtures of elastic resins and plasticisers. One such material known as urethane foam of cellular formation has been found to have the desired compressibility, resilience, toughness and resistance to wear and flame, as well as the ability to retain these qualities over long periods of use and when exposed to oils and greases or cleaning solutions.

As here shown, the pad or body 10 is generally rectangular, having a lower rounded edge 11, straight side edges 12 and a straight top edge 13 normal to the side edges, this shape being substantially that of the slot 3 in the journal box 2.

An axle-receiving opening 14 is provided in the pad or body 10 and has a diameter such that when the axle 7 is inserted therethrough, the pad will provide a tight circumferential seal around the axle.

A reliable sealing action is assured by making the body 10 of greater thickness than the width of the slot 3 so that the margin of the body defining the opening 14 will contact the axle over a substantial axially extended area, and by providing the body with large slot wall-engaging sealing surfaces of greater area than the walls of the slot. As here shown (see FIG. 1), the body 10 is of uniform thickness and the sealing surfaces are planar throughout the area of such surfaces. When the body 10 is positioned in the slot 3, it is compressed uniformly between the walls of the slot so that the sealing surfaces of the body opposite the walls are urged into tight, uniform sealing engagement with the walls throughout the full extent of such walls.

The compression of the resilient body 10 between the walls 4 and 5 leaves portions 10a thereof, which extend into the openings 6 in the walls 4, bulging laterally axially outwardly in these openings and into sealing engagement with the walls around the openings. Such compression also provides upper portions 10b of the body 10 bulging outward over and against the upper edges of the walls 4 and 5 at the mouth of the slot. These b ulging portions form reliable fluid tight seals. It should be particularly noted that this construction provides a unitary dust seal 10b on the oil seal body, thus eliminating the need for a separate so called dust wedge or the like in the mounth of the slot. The portions 10a in extending laterally into the openings 6 aid in holding the body against displacement in the slot, since upon lateral movement of the axle, the portions 10a provide a mass of material which will compress and resist bodily displacement into the seal. Of particular import however, is the fact that the bulging portions, i.e., the uncompressed portions 10a, afford an axially extended sealing area as aforesaid for engagement with the axle, thus enhancing the sealing action.

It is desired that the insertion of the body 10 into the slot 3 be effected without distorting the wall-engaging surfaces of the body to the extent that would dispose them out of proper sealing position or produce creases or grooves in such surfaces, as such creases or grooves would be likely to permit of leakage of foreign matter into the box as well as leakage of oil from the box. Accordingly, reinforcing or stabilizing means are provided to maintain the pad in desired form, with large and smooth sealing surfaces opposed to and uniformly sealingly engaged with the walls of the slot. For this purpose a continuous frame 16 encompasses the periphery of the pad or body 10, being preferably made of strap metal of less width than the thickness of the pad and of sufficient rigidity to reinforce the body. This frame has side and end portions 17 and 18 engaged with the curved bottom and side edges respectively of the body. These side and end portions may be adhesively secured or otherwise bonded to the side and bottom peripheral edges of the pad. The upper portion 19 of the frame is bowed upwardly from the upper edge of the body 10 and serves as a handle facilitating the insertion and removal of the device.

Another reinforcing and stabilizing means in the form of an annular axially extended resilient member or spring 20 is embedded in the pad 10 in adjacent and surrounding relation to the axle receiving opening 14 in the pad. This resilient member or spring is preferably of an undulated or marcelled wire construction, that is, it is convolved sinuously with the convolutions 21 extending generally parallel with the axis of the spring. This arrangement presents the flat surfaces of the convolutions 21 generally parallel with the axis of the opening 14, there being adequate sheath or sealing portion of the body 10 between the convolutions of the spring means and the wall of the opening 14. The spring may be embedded in the material of the body, by forming an annular slit 23 in the material, inserting the spring into this slit, then preferably sealing the slit by any suitable adhesive means. Embedded in this manner, the spring 21 prevents undesirable distortion of the axle engaging portion of the pad and causes this portion to be firmly pressed against the axle as a reliable fluid tight seal while at the same time permitting the customary lateral and radial movements of the axle without impairing the seal.

Inasmuch as the preferred material forming the pad or body 10 is cellular and porous, it may be desired to render the surfaces thereof impervious and this readily may be accomplished by providing an impervious coating or skin 24 thereon. This coating or skin may be molded on the body or pad or sprayed thereon or otherwise applied thereto or formed thereon. Any suitable coating or skin may be employed for this purpose provided it will not appreciably interfere with the compressibility and resilience of the body. However, without this impervious skin the body 10, when composed of urethane foam, due to the nature of the material, has marked retentive qualities such that oil absorbed thereby from the interior of the box will be retained effectively with no appreciable leakage past the sealing areas of the body.

It is important to note that in making the body or pad 10, the body or pad may be cut in desired size from a slab or sheet of such material or may be molded of such material to desired size. No special or complicated molds or dies or cutting or extruding equipment need be employed and the body 10 and the sealing device as a whole therefore may be produced at a comparatively low cost.

Another advantage of the sealing device hereof is that it will be securely retained in the dust guard slot of a journal box without the use of a closure plug, wedge or cap or any other fastening element, since the body 10 is securely frictionally held in the slot by frictional engagement, and the portions 10b thereof extended over the mouth of the slot 3, will preclude the entry of foreign matter into the seal slot, while the uncompressed portions 10a provide a sealing area of substantial axial extent for engagement with the axle.

It is to be understood that as used in the ensuing claims, the term "resilient compressible material" or similar terminology is intended to define a material which has the properties of being compressed and being capable of recovery, but which does not materially flow under compression.

I claim:

A seal for a journal box dust guard slot defined between walls having axle-receiving openings, said seal comprising: a body formed of a single sheet of an elastic and compressible material in the nature of sponge rubber; said body having an axle-receiving opening of less diameter than said wall openings; said body having a contour conforming generally to that of said slot and being substantially uniformly resilient and compressible throughout between the margins thereof; said body normally having a thickness throughout greater than the width of said slot, also a length greater than the depth of said slot whereby upon insertion into said slot, all of the portions of the body opposed to said walls will be intimately engaged therewith and uniformly compressed therebetween, while the portion of the body disposed between the axle-receiving opening therein and the edges of said walls defining said openings will be uncompressed so as to have a thickness throughout greater than the width of the slot and form seals against the axle and said edges of said walls, respectively; said greater length of said body providing an uncompressed marginal portion which will extend out of said slot to form a seal at the mouth of said slot; said body having an annular slit around the axle-receiving opening in said body; and an annular spring mounted in said slit so as to be embedded in said body; said spring being axially undulated.

References Cited in the file of this patent

UNITED STATES PATENTS

| | | |
|---|---|---|
| 2,071,736 | Farmer | Feb. 23, 1937 |
| 2,143,106 | Freedlander | Jan. 10, 1939 |
| 2,325,556 | Taylor et al. | July 27, 1943 |
| 2,417,853 | Armstrong | Mar. 25, 1947 |
| 2,551,563 | Jepson | May 1, 1951 |
| 2,746,778 | Hurlburt et al. | May 22, 1956 |
| 2,758,853 | Beck | Aug. 14, 1956 |
| 2,798,746 | Hoyer | July 9, 1957 |

FOREIGN PATENTS

| | | |
|---|---|---|
| 936,951 | France | Feb. 23, 1948 |